(12) United States Patent
Marik et al.

(10) Patent No.: US 7,460,915 B2
(45) Date of Patent: Dec. 2, 2008

(54) METHODS AND APPARATUS FOR PROCESS CONTROL USING CATALYST STATE ESTIMATION

(75) Inventors: Karel Marik, Revnice (CZ); Roman Navratil, Prague (CZ); Petr Stluka, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 221 days.

(21) Appl. No.: 11/471,919

(22) Filed: Jun. 21, 2006

(65) Prior Publication Data

US 2007/0299619 A1     Dec. 27, 2007

(51) Int. Cl.
*G05B 13/04*     (2006.01)
*G05B 21/00*     (2006.01)
(52) U.S. Cl. .............................. 700/31; 700/29; 700/44; 700/52; 700/266
(58) Field of Classification Search ................... 700/31, 700/29, 44, 52, 266; 703/12
See application file for complete search history.

(56) References Cited

U.S. PATENT DOCUMENTS

| | | | | |
|---|---|---|---|---|
| 5,841,678 | A * | 11/1998 | Hasenberg et al. | ............ 703/10 |
| 2005/0133419 | A1 | 6/2005 | Long et al. | |
| 2005/0267669 | A1 * | 12/2005 | Wang et al. | ................. 701/102 |
| 2006/0073013 | A1 * | 4/2006 | Emigholz et al. | ............. 416/35 |

* cited by examiner

*Primary Examiner*—Albert DeCady
*Assistant Examiner*—Steven R Garland
(74) *Attorney, Agent, or Firm*—Ingrassia Fisher & Lorenz, P.C.

(57) ABSTRACT

In a process control system, the hidden properties of a catalyst are estimated by including those properties in hidden states within a state space model and solving the state space model based on measurable inputs and outputs of the process. The process may include defining a state space model for a process having a catalyst state comprising a hidden catalyst property; defining a set of empirically measurable input variables for the state space model, defining a set of output variables for the state space model, measuring a set of input values corresponding to the set of input variables; measuring a set of output values corresponding to the set of output variables; and estimating the hidden catalyst property based on the input values, the output values, and the state space model.

13 Claims, 3 Drawing Sheets

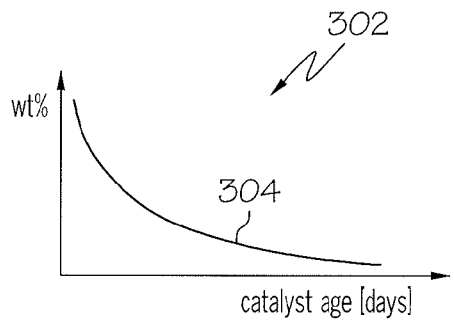
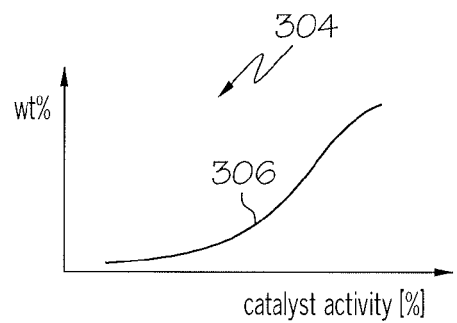
FIG. 3A
FIG. 3B
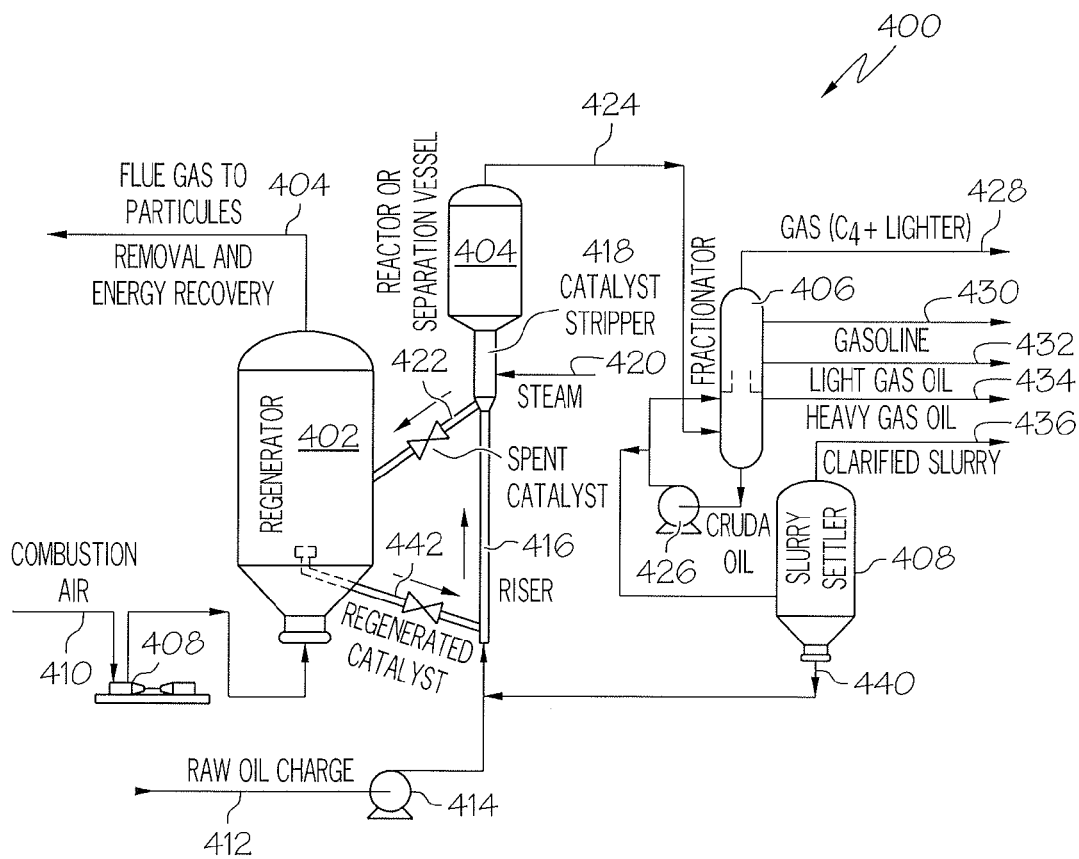
FIG. 4

METHODS AND APPARATUS FOR PROCESS CONTROL USING CATALYST STATE ESTIMATION

FIELD OF THE INVENTION

The present invention generally relates to process control schemes and, more particularly, to methods for estimating the properties of a process catalyst within a system.

BACKGROUND OF THE INVENTION

In process control systems, particularly those that involve one or more chemical processes, it is often desirable to utilize and track the behavior of some form of catalyst—i.e., a substance that initiates, accelerates, reduces the activation energy of, or otherwise assists in a chemical reaction while not taking part in that reaction as a product or reactant. Depending upon the nature of the process itself, such catalysts typically include, for example, transition metals, transition metal oxides, aluminum oxides, organic enzymes, and the like.

The behavior of a process that utilizes a catalyst is highly dependent upon the properties of that catalyst (e.g., catalyst activity, catalyst age, metal content), and thus it is desirable to understand the state of the catalyst for the purpose of, for example, predicting process yield. Unfortunately, it is very difficult to estimate the properties of a catalyst in situ.

Because a catalyst is usually a set of particles, a particular catalyst property is best represented as a distribution, rather than a single value. Furthermore, many different factors influence catalyst properties—including such mechanisms as thermal deactivation, metal poisoning, regeneration effectiveness, and catalyst makeup rate. While laboratory analysis may be performed on catalyst samples extracted from the process, such analyses can be time-consuming, unreliable, and expensive.

Accordingly, it is desirable to provide more reliable, timely, and inexpensive methods of estimating catalyst properties in a process control system. Other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with the present invention, the hidden properties of a process catalyst are estimated by including those properties in hidden states within a state space model and then solving that state space model based on measurable inputs and outputs of the process. In one embodiment, for example, a method for controlling a process of the type that utilizes a catalyst includes the steps of: defining a state space model for the process, the state space model including a catalyst state comprising a hidden catalyst property; defining a set of input variables for the state space model, wherein the input variables are empirically measurable properties of the process; defining a set of output variables for the state space model, wherein the output variables are empirically measurable properties of the process; measuring a set of input values corresponding to the set of input variables; measuring a set of output values corresponding to the set of output variables; and estimating the hidden catalyst property based on the input values, the output values, and the state space model.

BRIEF DESCRIPTION OF THE DRAWINGS

The present invention will hereinafter be described in conjunction with the following drawing figures, wherein like numerals denote like elements.

FIGS. 3A and 3B are a qualitative graphical depiction of catalyst age and catalyst activity expressed as a distribution, respectively; and FIG. 4 is a block diagram of an example fluid catalytic cracking (FCC) process useful in illustrating the present invention.

DETAILED DESCRIPTION OF THE INVENTION

The following detailed description of the invention is merely exemplary in nature and is not intended to limit the invention or the application and uses of the invention. Further, there is no intention to be bound by any theory presented in any part of this document. For the sake of brevity, conventional techniques related to data transmission, signaling, network control, catalytic processes, and process control may not be described in detail herein.

The various illustrative blocks, modules, circuits, and processing logic described in connection with the embodiments disclosed herein may be implemented in hardware, computer software, firmware, or any practical combination thereof. To clearly illustrate this interchangeability and compatibility of hardware, firmware, and software, various illustrative components, blocks, modules, circuits, and steps have been described above generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

The connecting lines shown in the various figures contained herein are intended to represent example functional relationships and/or physical couplings between the various elements. It should be noted that many alternative or additional functional relationships or physical connections may be present in a practical embodiment.

The present invention relates to methods and systems for process control using catalyst state estimation. As used herein, and as mentioned previously, the term "catalyst" means any substance that initiates, accelerates, reduces the activation energy of, or otherwise assists in a chemical reaction while not taking part in that reaction as a product or reactant. Stated another way, a catalyst assists in a reaction without affecting the net free energy change of that reaction.

A wide array of catalysts may be used, depending upon the specific process in which it is incorporated. In general, catalysts are classified as heterogeneous or homogeneous, where heterogeneous catalysts exist in a different phase from that of the reactants, and homogeneous catalysts exist in the same phase as the reactants. Catalysts include such materials as transition metals, transition metal oxides, aluminum oxides, organic enzymes and the like. Such catalysts are often provided in a powdered form, but may be in any form suitable for the given application.

Figure 1:
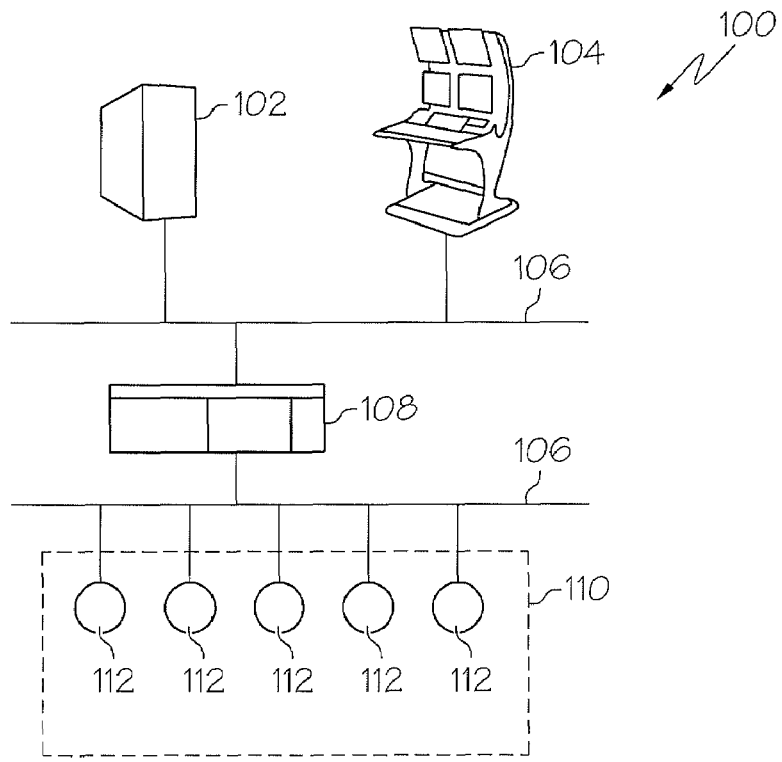
FIG. 1 is a conceptual overview of a process control system in accordance with an exemplary embodiment of the present invention.

FIG. 1 is a conceptual overview of a process control system 100 useful in describing the present invention. A system and/or process 110 (represented in the abstract by a dashed rectangle) is controlled via one or more operator stations 104, one or more process servers 102, and one or more process controllers 108 acting through a set of sensors, actuators, or other such input/output components 112. In the illustrated embodiment, the various components of system 100 are distributed over a network 106, which might be hard-wired, wireless, or any combination thereof, and may operate in accordance with any convenient data communication protocol.

Operator stations 104 include suitable hardware and software configured to allow a human operator some level of interaction with the other components in the system. In this regard, operator stations 104 typically include one or more visual displays, input/output devices, processors, storage devices, and the like.

Process server 102 similarly includes various hardware, software, and storage components configured to interact with operator system 104 and process controller 108. Process controller 108 interfaces with actuators and sensors 112 as commanded by operator station 104 and/or process server 102.

Process control system 100 will typically include additional components, which for the sake of brevity have not been illustrated—e.g., enterprise servers, data warehouse servers, desktop computers, asset management servers, plant simulation systems, supervisory controllers, and the like. In this regard, the present invention may be practiced in the context of any process control system, but in one embodiment is implemented in a distributed control system such as the EXPERION Process Knowledge System offered by Honeywell Industrial Automation Systems.

Process 110 is any process that includes, at least in part, a chemical reaction utilizing some form of catalyst. Regardless of the particular system architecture used, operator station 104, process server 102, and process controller 108 together, or individually, allow an operator to define a state space model for process 110, as well as the various inputs and outputs to be measured through sensors/actuators 112, and then estimate the hidden states of the catalyst provided within process 110 using the defined state space model.

Figure 2:
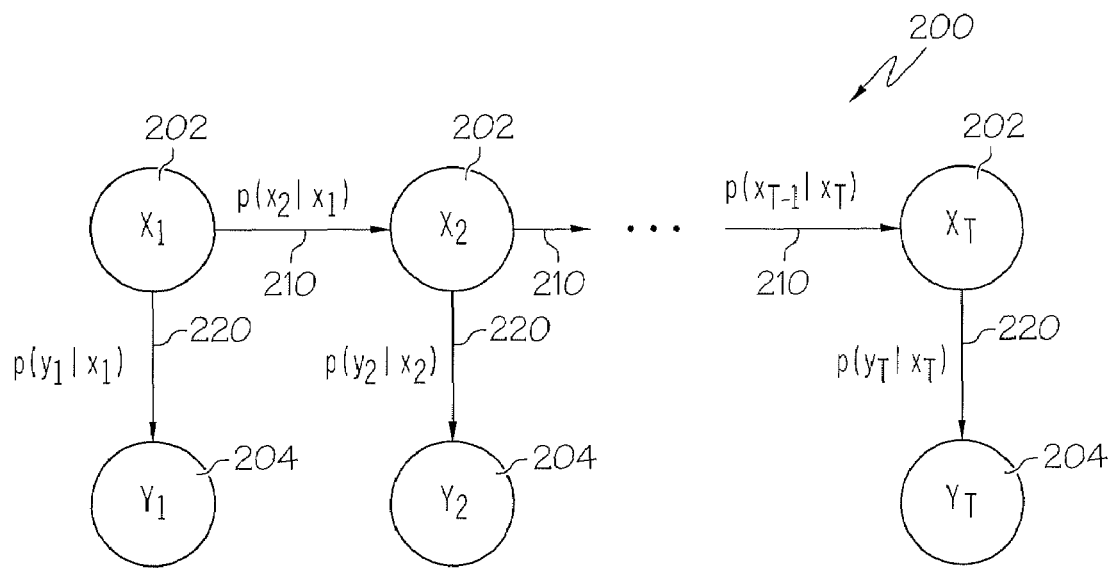
FIG. 2 is a state diagram in accordance with one embodiment of the present invention.

FIG. 2 is a state diagram depicting, at a high level of abstraction, a catalyst estimation method in accordance with one embodiment of the present invention. As is known in the art, a state diagram is a graphical representation of system's state over time. Each node 202 represents a particular state, or state vector, of one or more variables associated with the process.

In the illustrated embodiment, which is a directed graph, a series of state vectors 202 ($x_1, x_2, \ldots, x_T$) are defined, wherein the state vector includes at least one hidden state or property of the catalyst. Associated edges, arcs, or transitions $p(x2|x1)$ (210) describe the probability of a transition to a successive states 202 (e.g., $x_1 \rightarrow x_2$, etc.) in terms of a probabilistic distribution. The value $p(x_2|x_1)$ refers to the conditions under which a transition from one state to another will take place. Similarly, outputs y (204) (and their corresponding arcs) describe certain output variables (such as process yield, measurable process temperatures, etc) resulting from corresponding states 202. Thus, as a temporal model, the state of the process progresses in time from left to right in FIG. 2, beginning with some starting state x and output state y, and moving to successive states 202 during actual operation of the process.

For the state space model of FIG. 2, the state prediction equation is given as:

$$x(t)=f(x(t-1),u(t))+p$$

where x is the hidden state vector, f and g are unspecified relations, t is a discrete time value, u is the input vector (i.e., inputs to the system), and p is process noise. Similarly, the observation equation (describing the actual observable behavior of the system) is as follows:

$$y(t)=g(x(t),u(t))+q$$

where y is the output vector and q is measurement noise. Note that state variable need not be measured often, and in fact need not be measured at all if the model has become sufficiently robust. The functions f and g, however (and hence the relationship between u, x, and y), are preferably known. These functions might be known precisely, or may be known very roughly. In most processes, reaction kinetics are very complicated, and at the same time the problem of computing these functions is very complex. Consequently, it is often only possible to approximate f and g. Such approximations, however, are suitable for the purposes of this invention. In another embodiment, statistical models are used. That is, catalyst properties are measured from time to time, and then statistical models are used to infer the relationship between u, x, and y. Furthermore, it is not necessary for f and g to be time invariant: these functions might be modified over time.

Figure 5:
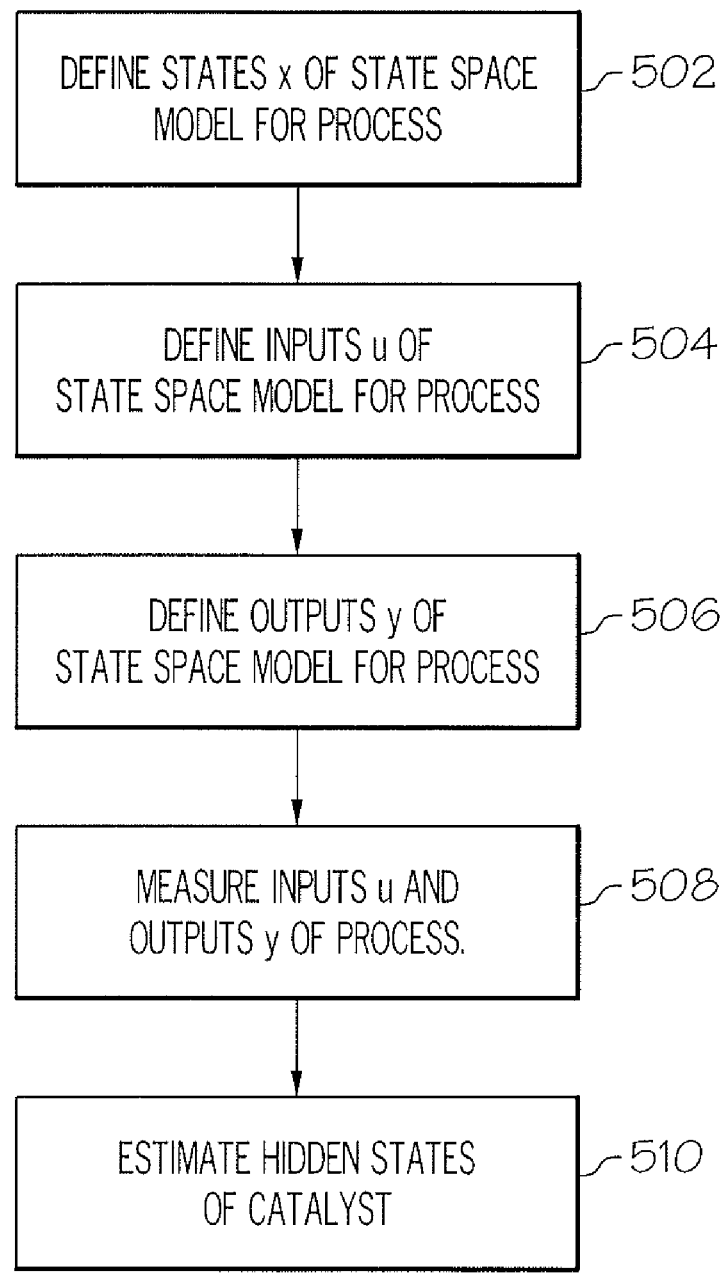
FIG. 5 is an overview of one embodiment of the present invention.

FIG. 5 shows an overview of a process in accordance with one embodiment of the present invention. In general, the process includes a definitional portion (i.e., a series of steps 502-506 wherein the state space model is defined), and an empirical portion (i.e., steps 508-510 that include measuring inputs and estimating hidden states).

First, in step 502, the system (e.g., an operator utilizing operator station 104, server 102, and/or controller 108) defines states x of a state space model for process 110. These states include at least one hidden property of the catalyst—for example, catalyst activity, catalyst age, metals on catalyst surface, etc.

In one embodiment, catalyst properties are expressed as a distribution, rather than a simple scalar value. That is, because a catalyst material present in a process is essentially a set of particles, catalyst properties are best represented by a distribution based on, for example, weight percent of available catalyst. Referring momentarily to FIG. 3, for example, graph 302 shows a catalyst age distribution 304 (in days) by weight percent of catalyst. In this example state, there are more "young" (or "fresh") catalyst particles in the system than "old" (or "spent") catalyst particles. Similarly, graph 304 shows a catalyst activity distribution 306 (in percent active) by weight percent of catalyst, wherein the system includes more active catalyst particles than inactive catalyst particles. Thus, at any given time, the properties of the catalyst (i.e., the set of catalyst particles) may be characterized by a set of such distributions.

After the states of the state space model have been defined, the system defines inputs u of the state space model for the process (step 504). These input variables (expressed as a vector) preferably allow their values to be measured in a simple manner. Such variables might include, for example, temperatures of certain components of the process, metal content, and the like. The measurement of such variables is well known in the art, and need not be described herein.

Next, in step 506, the outputs y of the state space model are defined. The vector y preferably includes one or more easily-measurable variables that capture some aspect of process yield—e.g., amount of material produced by the process.

In step 508, inputs u and outputs y are measured (e.g., using appropriate sensors/actuators 110 shown in FIG. 1). Finally, in step 510, the hidden states x of the catalyst are estimated using the previously-defined state space model. This may be accomplished in a variety of ways, using a Kalman filtering technique, a sequential Monte Carlo, technique, or any other known method for solving state space models. As is known in the art, Kalman filtering is a recursive method for estimating the state of a dynamic system using a set of incomplete and noisy measurements. The sequential Monte Carlo method, in contrast, which is also often referred to as a type of "particle filter," involves model estimation based on simulation of the process. Both of these methods are known in the art, and need not be described in detail herein. Regardless of the method used, the system produces as estimate of hidden state vector x from available measurements.

For the purpose of example, FIG. 4 depicts a fluid catalytic cracking (FCC) system 400 useful in more fully describing a method in accordance with the present invention. "Cracking" in this context refers to the breaking down of large hydrocarbon molecules into smaller, more useful constituents. Such a system is one of a general class of refining processes used in the petroleum industry. It will be appreciated, however, that the invention is not so limited, and may be practiced in any system that incorporates some form of catalytic process.

With reference to FIG. 4, an exemplary FCC system 400 includes a regenerator 402, a reactor (or separation vessel) 404, a fractionator 406, a slurry settler 408, pumps 414 and 426, and an air processor 408. In general, FCC 400 is configured to crack oil in the presence of a finely divided catalyst which is maintained in an aerated or fluidized state by oil vapors. FCC 404 comprises a catalyst section (reactor 404 and regenerator 402) and a fractionating section (fractionator 406 and slurry settler 408) that operate together to accomplish the desired cracking. A raw oil charge (or "hydrocarbon charge") 412 is pumped (via pump 414) into riser 416 of reactor 404 where it is mixed with regenerated catalyst 442 from regenerator 402. Regenerator 402 accepts combustion air 406 through processor 408, and produces a flue gas 404, from which particulates are later removed and energy is suitably recovered.

The hydrocarbon within riser 416 is mixed with steam 420, where it is vaporized and raised to the reactor temperature by the hot catalyst. Cracking thus takes place in riser 416, and reactor 404 acts primarily as a holding vessel. Cracking continues until the oil vapors are separated from the catalyst in the reactor (i.e., the reactor cyclones). The resulting cracked product 424 is then charged to fractionator 406, where it is separated into fractions, and some of the heavy oil 440 is recycled to riser 416 via pump 426 and slurry settler 408. The fluid catalyst (422 in a spent state, 442 in a regenerated state) is thus continuously circulated between reactor 404 and regenerator 402 as shown, using air, oil vapors, and steam. The catalyst is inactivated by coke during reaction in riser 416, but the coke is later burned away in regenerator 402. As shown, a number of products result, including a C4 gas 428, gasoline 430, light gas oil 432, heavy gas oil 434, and clarified slurry 436.

It will be appreciated that the foregoing description of the illustrated FCC process 400 was, for the purpose of brevity, simplified to present an example context for practicing the present invention. System 400 might also include a number of other components and processes that are not important for the present discussion.

The catalyst used in the illustrated cracking process 400 may include, for example, any of the various zeolite-based catalysts. Zeolite, as is known in the art, is a hydrated alumino-silicate mineral that may be found naturally or produced synthetically, and is often used in connection with FCC processes.

The activity of the catalyst is influenced in a number of ways by system 400. Activity-increasing mechanisms include regeneration (de-coking), and replacement of spent catalyst, as described above, while activity-decreasing mechanisms include, for example, coking, poisoning, and thermal deactivation. As is known in the art, "coking" of a catalyst occurs when carbon ash residue is introduced onto (or into) the catalyst during a combustion process, and "poisoning" of a catalyst occurs when another compound reacts and bonds chemically to the catalyst, reducing or substantially destroying its efficacy. Thermal deactivation of a catalyst refers to the reduction in activity attending a drop in temperature.

In accordance with the present invention, catalyst properties are estimated by including those properties in hidden states within a state space model. More particularly, with continued reference to FIG. 4, states x of the state space model can be defined as a vector of reactor 404 temperature $T_R$, regenerator 402 temperature $T_X$, and a distribution ($p(A) = p_A$) of catalyst activity across all catalyst particles in the reactor. These temperatures are hidden in the sense that they are "representative" temperatures and cannot be directly measured. Thus, the states can be expressed as:

$$x = (T_R, T_X, p_A)$$

The inputs u of the state space model can be defined as a vector of feed temperature $T_{FEED}$, content (i.e., concentration) of catalyst poisoning elements (e.g., sulfur, vanadium, sodium, and/or nickel) $c_s$, $c_v$, $c_{Na}$, $c_{Ni}$, and flow rate of regenerator combustion air 410, $V_{air}$:

$$u = (T_{FEED}, c_s, c_v, c_{Na}, c_{Ni}, V_{air})$$

Furthermore, the outputs y of the state space model (see FIG. 2) can be defined as a vector of reactor 404 outlet temperature $T_{RO}$, regenerator flue gas 404 outlet temperature $T_{XO}$, and fractions of cracked products (428, 430, 432, 434, and 436) $c_x$:

$$y = (T_{RO}, T_{XO}, c_{Gas}, c_{Gasoline}, c_{LightOil}, c_{HeavyOil}, c_{Slurry})$$

The state prediction equation can then be expressed as:

$$x^t = f(x^{t-1}, u^t)$$

$$[T_R^t, T_X^t, p_A^t]^T = f(T_R^{t-1}, T_X^{t-1}, p_A^{t-1}, T_{FEED}^t, c_S^t, c_V^t, c_{Na}^t, c_{Ni}^t, V_{AIR}^t)$$

where f is an unspecified nonlinear and stochastic function able to derive new state $x^t$ based on the last known state $x^{t-1}$ and new system input $u^t$. Function f preferably takes into account various catalyst activity-influencing factors mentioned above as then affect catalyst activity $p_A$.

The observation equation may then be defined as:

$$y^t = g(x^t, u^t)$$

$$[T_{RO}^t, T_{XO}^t, c_{Gas}^t, c_{Gasoline}^t, c_{LightOil}^t, c_{HeavyOil}^t, c_{Slurry}^t]^T = g(T_R^t, T_X^t, p_A^t, T_{FEED}^t, c_S^t, c_V^t, c_{Na}^t, c_{Ni}^t, c_{AIR}^t)$$

where g is an unspecified nonlinear and stochastic function able to predict outputs $y^t$ based on estimated state $x^t$ and new system input $u^t$.

Distribution of catalyst activity $p_A$ (a hidden state) in reactor 404 may be approximated using a variety of techniques—i.e., modeling it as one of a variety of known statistical distributions (e.g., gamma or Weibull distributions) or as a mixture of distributions. In general, it is expected that the distribution is non-Gaussian and possibly multi-modal. For example, $p_A$ can be approximated by a mixture of Gaussian curves or by a finite number of weighted samples (i.e., samples of catalyst particles).

Based upon a particular approximation of $p_A$ and the form of functions f and g, the state space model can be solved using a variety of techniques. Suitable techniques include, for example, use of a Kalman filter (and its variants), a hidden Markov model, or a sequential Monte Carlo technique. Kalman filters and sequential Monte Carlo techniques are predictor/corrector techniques. That is, the predictor (f) predicts the next state values from the past estimated state values and known input values. The corrector method (g) corrects the estimation by observing the output values. The Kalman filter corrector consists of applying an inversion of function g, which is in linear matrix form and can be inverted. Particle filters work with multiple state vector hypothesis while trying to assign weight to each hypothesis according to observed values y. Such techniques are known in the art, and need not be described in detail herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for controlling a physical process of the type utilizing a catalyst to produce an end product from one or more substances, the method including the steps of:
    defining, within an automated computer system, a state space model for the process, the state space model including a catalyst state comprising a hidden catalyst property in the form of a distribution of catalyst weight percent with respect to the one or more substances;
    defining, within the automated computer system, a set of input variables for the state space model, wherein the input variables are empirically measurable properties of the process;
    defining, within the automated computer system, a set of output variables for the state space model, wherein the output variables are empirically measurable properties of the process and the end product, and wherein the set of output variables includes a process yield variable;
    measuring a set of input values corresponding to the set of input variables;
    measuring a set of output values corresponding to the set of output variables;
    estimating the hidden catalyst property based on the input values, the output values, and the state space model;
    controlling the process in a manner responsive to the estimating step in order to produce the end product.

2. The method of claim 1, wherein the hidden catalyst property is selected from the group consisting of catalyst activity, catalyst age, and metal on catalyst surface.

3. The method of claim 1, wherein estimating the hidden catalyst property includes approximating the hidden catalyst property as a mixture of Gaussian distributions.

4. The method of claim 1, wherein estimating the hidden catalyst property includes approximating the hidden catalyst property through a finite number of weighted samples.

5. The method of claim 1, further including solving the state space model using a method selected from the group consisting of Kalman filtering, hidden Markov modeling, and sequential Monte Carlo modeling.

6. The method of claim 1, wherein the process is a fluid catalytic cracking (FCC) process implemented within a system including a reactor and a regenerator, and wherein:
    the catalyst state includes a temperature of the reactor, a temperature of the regenerator, and a catalyst activity distribution;
    the set of input variables includes feed temperature of the FCC process, content of catalyst poisoning elements, and flow rate of combustion air for the regenerator;
    the set of output variables includes an outlet temperature of the regenerator, a flue gas outlet temperature for the regenerator, and a process yield variable.

7. A process control system for controlling a physical process of the type utilizing a catalyst to produce an end product from one or more substances, the system comprising:
    a set of input/output components configured to interface with the process;
    a process controller coupled to and configured to exchange electrical signals with the set of input/output components;
    a process server and an operator station coupled to the process controller over a network, the process server, operator station, and process controller configured to collectively perform the steps of: defining a state space model for the process, the state space model including a catalyst state comprising a hidden catalyst property in the form of a distribution of catalyst weight percent with respect to the one or more substances; defining a set of input variables for the state space model, wherein the input variables are empirically measurable properties of the process; defining a set of output variables for the state space model, wherein the output variables are empirically measurable properties of the process; measuring a set of input values corresponding to the set of input variables; measuring a set of output values corresponding to the set of output variables; and estimating the hidden catalyst property based on the input values, the output values, and the state space model;
    wherein the process controller is further configured to control the process in a manner responsive to the estimating step in order to produce the end product.

8. The system of claim 7, wherein the set of output variables includes a process yield variable.

9. The system of claim 7, wherein the hidden catalyst property is selected from the group consisting of catalyst activity, catalyst age, and metal on catalyst surface.

10. The system of claim 7, wherein the hidden catalyst property is approximated as a mixture of Gaussian distributions.

11. The system of claim 7, wherein the hidden catalyst property is approximated as a mixture of a finite number of weighted samples.

12. The system of claim 7, wherein the state space model is solved using a method selected from the group consisting of Kalman filtering, hidden Markov modeling, and sequential Monte Carlo modeling.

13. The system of claim 7, wherein the process is a fluid catalytic cracking (FCC) process implemented within a system including a reactor and a regenerator, and wherein:

the catalyst state includes a temperature of the reactor, a temperature of the regenerator, and a catalyst activity distribution;

the set of input variables includes feed temperature of the FCC process, content of catalyst poisoning elements, and flow rate of combustion air for the regenerator;

the set of output variables includes an outlet temperature of the regenerator, a flue gas outlet temperature for the regenerator, and a process yield variable.

* * * * *